United States Patent
Ke

(10) Patent No.: US 10,340,802 B1
(45) Date of Patent: Jul. 2, 2019

(54) POWER CONVERSION APPARATUS WITH LOW POWER CONSUMPTION AND LOW COST

(71) Applicant: Power Forest Technology Corporation, Hsinchu County (TW)

(72) Inventor: Po-Jen Ke, Taoyuan (TW)

(73) Assignee: Power Forest Technology Corporation, Hsinchu County (TW)

( * ) Notice: Subject to any disclaimer, the term of this patent is extended or adjusted under 35 U.S.C. 154(b) by 0 days.

(21) Appl. No.: 16/114,257

(22) Filed: Aug. 28, 2018

(30) Foreign Application Priority Data

Jun. 29, 2018 (TW) .............................. 107122497 A

(51) Int. Cl.
*H02M 3/158* (2006.01)
*H02M 1/34* (2007.01)
*H02M 1/00* (2006.01)
*H02M 7/219* (2006.01)

(52) U.S. Cl.
CPC ........... *H02M 3/1584* (2013.01); *H02M 1/34* (2013.01); *H02M 7/219* (2013.01); *H02M 2001/0006* (2013.01); *H02M 2001/0032* (2013.01)

(58) Field of Classification Search
None
See application file for complete search history.

(56) References Cited

U.S. PATENT DOCUMENTS

| 7,161,813 | B2 | 1/2007 | Librizzi et al. | |
| 2009/0290391 | A1* | 11/2009 | Toccaceli | H02M 3/33592 363/21.14 |
| 2010/0027298 | A1 | 2/2010 | Cohen | |
| 2010/0244941 | A1* | 9/2010 | Stuler | H02M 1/34 327/543 |
| 2012/0063175 | A1 | 3/2012 | Wang et al. | |
| 2013/0107582 | A1* | 5/2013 | Sato | H02M 3/33592 363/21.06 |
| 2015/0244254 | A1* | 8/2015 | Skinner | H02M 3/33507 323/222 |
| 2016/0049876 | A1* | 2/2016 | Lee | H02M 3/33592 363/20 |

FOREIGN PATENT DOCUMENTS

| TW | 200919919 | 5/2009 |
| TW | 201036311 | 10/2010 |

OTHER PUBLICATIONS

"Office Action of Taiwan Counterpart Application", dated Feb. 13, 2019, p. 1-p. 4.

* cited by examiner

*Primary Examiner* — Jeffrey A Gblende
(74) *Attorney, Agent, or Firm* — JCIPRNET

(57) ABSTRACT

A power conversion apparatus including a synchronous rectification (SR) transistor, a SR controller and a snubber circuit is provided. The SR controller is coupled to the SR transistor to control the SR transistor. A ground terminal of the SR controller is coupled to a source terminal of the SR transistor, and a power terminal of the SR controller is coupled to a system voltage. A first terminal of the snubber circuit is coupled to a drain terminal of the SR transistor. A second terminal of the snubber circuit is coupled to the power terminal of the SR controller. The snubber circuit obtains power from the drain terminal of the SR transistor and provides the system voltage accordingly.

8 Claims, 4 Drawing Sheets

POWER CONVERSION APPARATUS WITH LOW POWER CONSUMPTION AND LOW COST

CROSS-REFERENCE TO RELATED APPLICATION

This application claims the priority benefit of Taiwan application serial no. 107122497, filed on Jun. 29, 2018. The entirety of the above-mentioned patent application is hereby incorporated by reference herein and made a part of this specification.

BACKGROUND

Field of the Invention

The invention relates to a power conversion apparatus and more particularly, to a power conversion apparatus with low power consumption and low cost.

Description of Related Art

A power conversion apparatus is an indispensable element in modern electronic apparatus. In a pulse width modulation (PWM)-based power conversion apparatus, a secondary side of the power conversion apparatus is usually provided with a rectification diode. Since the rectification diode in a turned-on state has large power consumption, a synchronous rectification (SR) transistor with a low on-resistance may be used to replace the rectification diode. Under such architecture, an SR controller is further required to control the turning-on/turning-off of the SR transistor of the secondary side.

Generally, the SR transistor may be usually disposed on an upper end or a lower end of the secondary side of a transformer of the power conversion apparatus. In the circuit architecture in which the SR transistor is disposed on the upper end of the secondary side of the transformer of the power conversion apparatus, a working power supply required for the operation of the SR controller may be provided in two manners below. In the first manner, the power is supplied to the SR controller via an auxiliary coil of the transformer, however, this manner would result in the increase in the cost of the transformer and the difficulty in the transformer winding. In the second manner, the power is supplied to the SR controller by a main coil of the secondary side of the transformer via the rectification diode and a regulator circuit, however, this manner would result in the increase in the power consumption in a condition that the main coil of the secondary side has a higher voltage. Thus, how to supply power to the SR controller as well as avoiding the increase in the cost of the power conversion apparatus and the overall power consumption is an important subject that those skilled in the art have to face to.

SUMMARY

Accordingly, the invention provides a power conversion apparatus capable of generating a system voltage according to a voltage drop between a drain terminal and a source terminal of a synchronous rectification (SR) transistor to supply power to the SR controller, so as to avoid the increase in the cost of the power conversion apparatus and the overall power consumption.

A power conversion apparatus of the invention includes a synchronous rectification (SR) transistor, a SR controller and a snubber circuit. The SR controller is coupled to the SR transistor to control the SR transistor, wherein a ground terminal of the SR controller is coupled to a source terminal of the SR transistor, and a power terminal of the SR controller receives a system voltage. A first terminal of the snubber circuit is coupled to a drain terminal of the SR transistor, and a second terminal of the snubber circuit is coupled to the power terminal of the SR controller. The snubber circuit obtains power from the drain terminal of the SR transistor and provides the system voltage accordingly.

In an embodiment of the invention, the power conversion apparatus further includes a power supply circuit. The power supply circuit is coupled to the second terminal of the snubber circuit and the source terminal of the SR transistor. The snubber circuit and the power supply circuit operate in cooperation to suppress a voltage surge between the drain terminal and the source terminal of the SR transistor and generate the system voltage according to a voltage drop between the drain terminal and the source terminal of the SR transistor.

In an embodiment of the invention, the snubber circuit includes a resistor and a first capacitor. A first terminal of the resistor is coupled to the drain terminal of the SR transistor. The first capacitor is coupled between a second terminal of the resistor and the power supply circuit.

In an embodiment of the invention, the power supply circuit includes a first diode, a second diode and a second capacitor. An anode terminal of the first diode is coupled to the source terminal of the SR transistor, and a cathode terminal of the first diode is coupled to the second terminal of the snubber circuit. An anode terminal of the second diode is coupled to the cathode terminal of the first diode. A first terminal of the second capacitor is coupled to the source terminal of the SR transistor, and a second terminal of the second capacitor is coupled to a cathode terminal of the second diode to provide the system voltage.

In an embodiment of the invention, the first diode is a Zener diode.

In an embodiment of the invention, the power supply circuit further includes a Zener diode. An anode terminal of the Zener diode is coupled to the first terminal of the second capacitor, and a cathode terminal of the Zener diode is coupled to the second terminal of the second capacitor.

In an embodiment of the invention, when the SR transistor is in a turned-off state, the voltage drop charges the second capacitor and supplies power to the SR controller through the resistor, the first capacitor and the second diode.

In an embodiment of the invention, when the SR transistor is in a turned-on state, the first capacitor is discharged through the resistor, the SR transistor and the first diode, and the second capacitor supplies power to the SR controller.

In an embodiment of the invention, the SR controller provides a control signal to a gate terminal of the SR transistor. The system voltage is determined according to the following formula:

$$VCC = C \times \left( \frac{Vds - Vf}{\frac{1}{RL \times f} + C} \right),$$

wherein VCC represents the system voltage, C represents a capacitance value of the first capacitor, Vds represents the voltage drop, Vf represents a forward bias voltage of the second diode, RL represents an equivalent impedance between the power terminal and the ground terminal of the SR controller, and f represents a switching frequency of the control signal.

To sum up, in the power conversion apparatus provided by the embodiments of the invention, the snubber circuit and the power supply circuit can operate in cooperation to suppress the voltage surge between the drain terminal and the source terminal of the SR transistor and generate the system voltage according to the voltage drop between the drain terminal and the source terminal of the SR transistor, thereby supplying power to the SR controller. Thus, the system voltage required for the operation of the SR controller does not have to be supplied by the auxiliary coil of the transformer, such that the cost and the difficulty in the winding of the transformer can be reduced. In addition, the system voltage required for the operation of the SR controller is also not provided by the coil of the secondary side of the transformer, such that in a condition that a voltage of the coil of the secondary side is high, the power consumption additionally generated due to the voltage being bucked through the rectification diode and the regulator circuit can be prevented.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
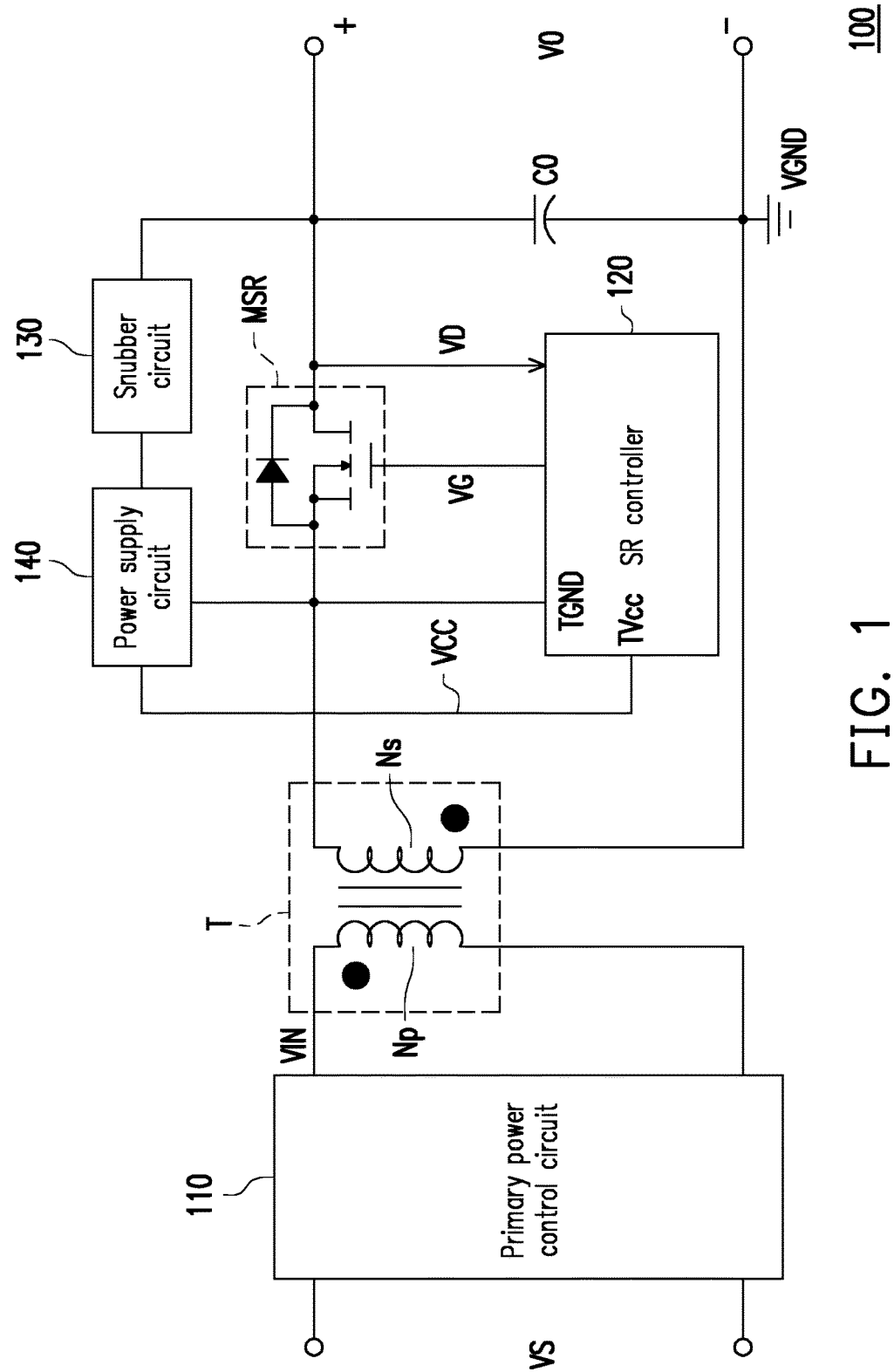
FIG. 1 is a schematic circuit block diagram illustrating a power conversion apparatus according to an embodiment of the invention.

In order to make the invention more comprehensible, embodiments are described below as the examples to show the invention. Moreover, elements/components/steps with same reference numerals represent same or similar parts in the drawings and embodiments. In addition, the term "couple" used in the specification may be "indirect couple" or "direct couple".

An architecture of a power conversion apparatus of the invention may be a flyback type, a push-pull type, a forward type, a half-bridge type, a full-bridge type or any other type, but the architecture of the power conversion apparatus is not particularly limited in the invention. However, for descriptive convenience, the power conversion apparatus having a flyback architecture is taken as an example for explanation, while the power conversion apparatus having any other architecture may derive from this.

FIG. 1 is a schematic circuit block diagram illustrating a power conversion apparatus according to an embodiment of the invention. Referring to FIG. 1, a power conversion apparatus 100 may include a primary power control circuit 110, a transformer T, a synchronous rectification (SR) transistor MSR, a SR controller 120, a snubber circuit 130 and a power supply circuit 140, but the invention is not limited thereto. In an embodiment of the invention, the power conversion apparatus 100 may further include an output capacitor CO coupled between a drain terminal of the SR transistor MSR and a ground level VGND. In another embodiment of the invention, the power supply circuit 140 may also be integrated in the SR controller 120.

The primary power control circuit 100 is configured to receive a power supply voltage VS and perform power conversion on the power supply voltage VS to generate an input voltage VIN, wherein the power supply voltage VS may be an AC voltage or a DC voltage, which depends on actual application or design requirements.

The transformer T includes a primary side Np and a secondary side Ns. A first terminal (for example, a common-polarity terminal, i.e. a dotted terminal) of the primary side Np is configured to receive the input voltage VIN, and a first terminal (for example, a common-polarity terminal) of the secondary side Ns is coupled to the ground level VGND. A source terminal of the SR transistor MSR is coupled to a second terminal (for example, an opposite-polarity terminal, i.e., a non-dotted terminal) of the secondary side Ns. A gate terminal of the SR transistor MSR receives a control signal VG. The drain terminal of the SR transistor MSR provides an output voltage VO to a load (not shown).

The SR controller 120 is coupled to the SR transistor MSR and configured to receive a voltage VD of the drain terminal of the SR transistor MSR and generate the control signal VG accordingly, wherein a ground terminal TGND of the SR controller 120 is coupled to the source terminal of the SR transistor, and a power terminal TVcc of the SR controller 120 receives a system voltage VCC.

A first terminal of the snubber circuit 130 is coupled to the drain terminal of the SR transistor MSR. A second terminal of the snubber circuit 130 is coupled to the power terminal TVcc of the SR controller 120 through the power supply circuit 140. The snubber circuit 130 may obtain power from the drain terminal of the SR transistor MSR and accordingly provide the system voltage VCC required for the operation of the SR controller 120. The power supply circuit 140 is coupled to the second terminal of the snubber circuit 130 and the source terminal of the SR transistor MSR. Specially, the snubber circuit 130 and the power supply circuit 140 may operate in cooperation to suppress a voltage surge between the drain terminal and the source terminal of the SR transistor MSR and generate the system voltage VCC according to a voltage drop between the drain terminal and the source terminal of the SR transistor MSR.

As the system voltage VCC required for the operation of the SR controller 120 is not supplied by an auxiliary coil of the transformer T, the transformer T having no auxiliary coil may be used, such that the cost and the difficulty in the winding of the transformer T can be reduced. In addition, the system voltage VCC required for the operation of the SR controller 120 is also not provided by a coil of the secondary side Ns of the transformer T, such that in a condition that a voltage of the coil of the secondary side Ns is high, the power consumption additionally generated due to the voltage being bucked through the rectification diode and the regulator circuit may be prevented.

In an embodiment of the invention, the primary power control circuit 110 may be, for example, a currently available AC-to-DC conversion circuit or DC-to-DC conversion circuit, and the SR controller 120 may be, for example, a currently available SR controller, which constitute no limitations to the invention. The implementation manners of the snubber circuit 130 and the power supply circuit 140 are provided below for description.

Figure 2:
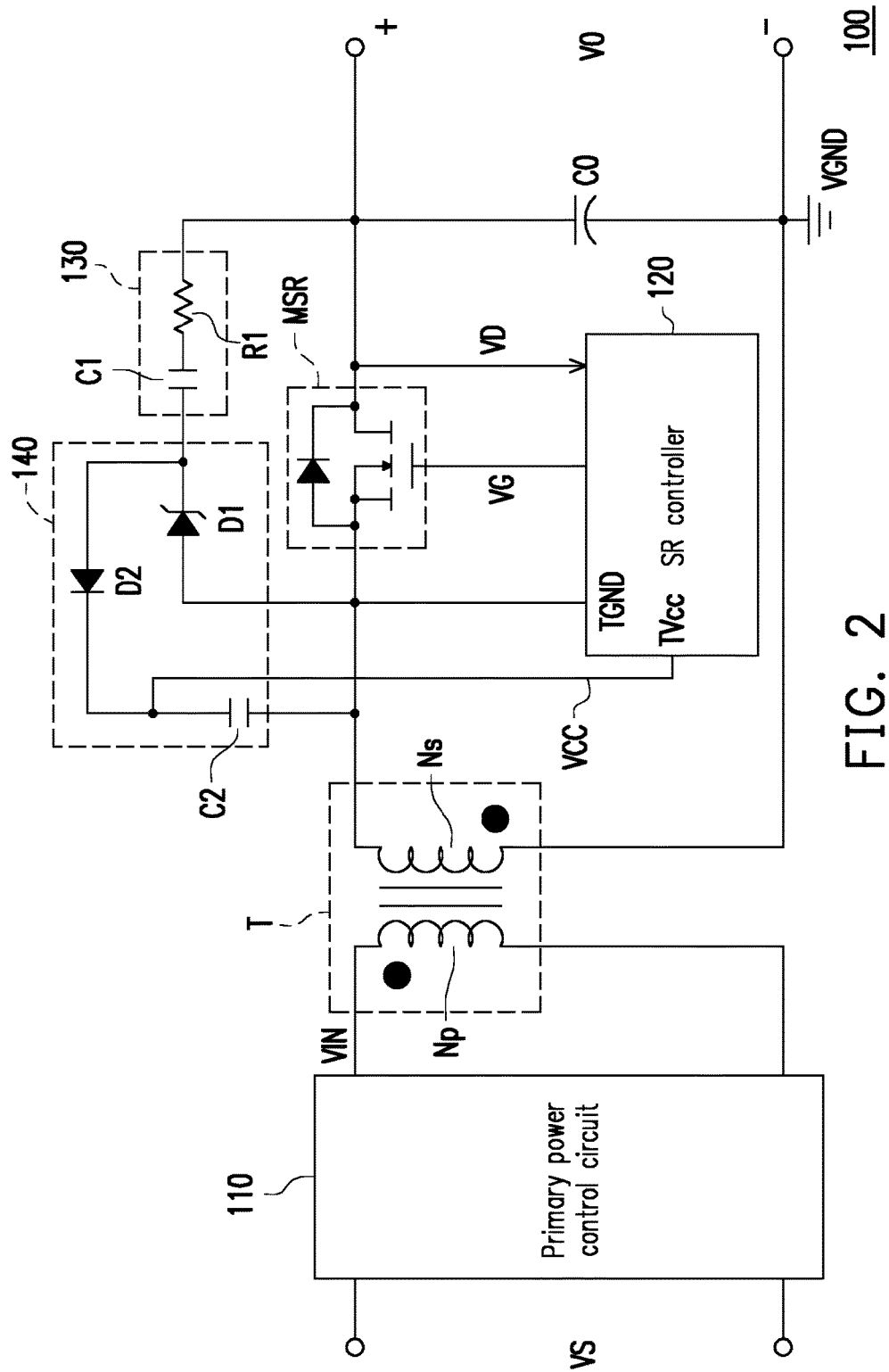
FIG. 2 is a schematic circuit architecture diagram of the power conversion apparatus depicted in FIG. 1 according to an embodiment of the invention.

FIG. 2 is a schematic circuit architecture diagram of the power conversion apparatus depicted in FIG. 1 according to an embodiment of the invention. Referring to FIG. 2, a primary power control circuit 110, a transformer T, an SR transistor MSR and an SR controller 120 illustrated in FIG. 2 are respectively similar to the primary power control circuit 110, the transformer T, the SR transistor MSR and the SR controller illustrated in FIG. 1, which may thus refer to the description related to FIG. 1 and will not be repeatedly described. The snubber circuit 130 may include a resistor R1 and a first capacitor C1, but the invention is not limited thereto. The resistor R1 and the first capacitor C1 are connected in series between the SR transistor MSR and the power supply circuit 140. Furthermore, a first terminal of the resistor R1 is coupled to the drain terminal of the SR transistor, and the first capacitor C1 is coupled between a second terminal of the resistor R1 and the power supply circuit 140.

The power supply circuit includes a first diode D1, a second diode D2 and a second capacitor C2, but the invention is not limited thereto. An anode terminal of the first diode is coupled to the source terminal of the SR transistor MSR, and a cathode terminal of the first diode D1 is coupled to the second terminal of the snubber circuit 130. An anode terminal of the second diode D2 is coupled to the cathode terminal of the first diode D1. A first terminal of the second capacitor C2 is coupled to the source terminal of the SR transistor MSR, and a second terminal of the second capacitor C2 is coupled to a cathode terminal of the second diode D2 to provide the system voltage VCC. In an embodiment of the invention, the first diode D1 may be a Zener diode used for stabilizing the system voltage VCC, but the invention is not limited thereto.

The resistor R1 and the first capacitor C1 (i.e., the snubber circuit 130) may suppress a voltage surge between the drain terminal and the source terminal of the SR transistor MSR. In addition, when the SR transistor SMR is in a turned-off state, the voltage drop is generated between the drain terminal and the source terminal of the SR transistor MSR, wherein the voltage drop may charge the second capacitor C2 and supply power to the SR controller 120 through the resistor R1, the first capacitor C1 and the second diode D2. By contrast, when the SR transistor MSR is in a turned-on state, the first capacitor C1 may be discharged through the resistor R1, the SR transistor MSR and the first diode D1, and the SR controller 120 may be supplied with power by the second capacitor C2.

Figure 3:
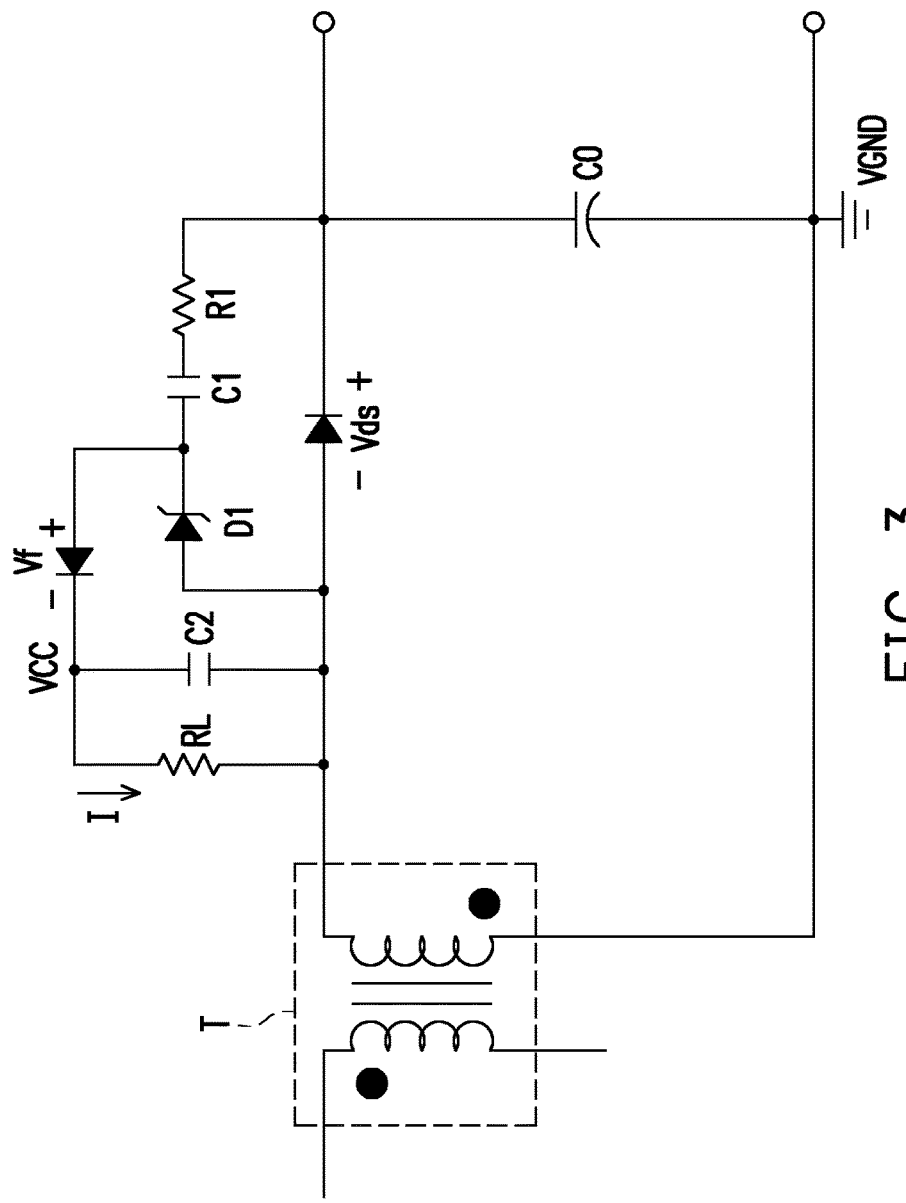
FIG. 3 is a schematic equivalent circuit diagram of the power conversion apparatus depicted in FIG. 2 according to an embodiment of the invention.

FIG. 3 is a schematic equivalent circuit diagram of the power conversion apparatus depicted in FIG. 2 according to an embodiment of the invention. For descriptive convenience, the primary power control circuit 110 is omitted in FIG. 3, and the SR transistor MSR is represented by a parasitic diode Dr between a drain terminal and a source terminal thereof, while an equivalent impedance between the power terminal TVcc and the ground terminal TGND of the SR controller 120 (which is an internal load of the SR controller 120) is represented by RL. Referring to FIG. 3, when the SR transistor SMR is in a turned-off state, a voltage drop Vds exists between the drain terminal and the source terminal of the SR transistor MSR. Thus, in a premise that a resistance value of the resistor R1 is omitted, a charge quantity QC of the first capacitor C1 is represented by Formula (1), wherein C represents a capacitance value of the first capacitor C1, and Vf represents a forward bias voltage of the second diode D2. A charge quantity QL provided to the SR controller 120 is represented by Formula (2), wherein I represents a current provided to the SR controller 120, and f represents a switching frequency of the control signal VG illustrated in FIG. 2.

$$QC = C \times (Vds - VCC - Vf) \qquad \text{Formula (1)}$$

$$QL = I \times \frac{1}{f} = \frac{VCC}{RL} \times \frac{1}{f} \qquad \text{Formula (2)}$$

It may be understood that the charge quantity QC of the first capacitor C1 is substantially equal to the charge quantity QL provided to the SR controller 120. Thus, the system voltage VCC as represented by Formula (3) may be obtained according to Formulas (1) and (2).

$$VCC = C \times \left( \frac{Vds - Vf}{\frac{1}{RL \times f} + C} \right) \qquad \text{Formula (3)}$$

Figure 4:
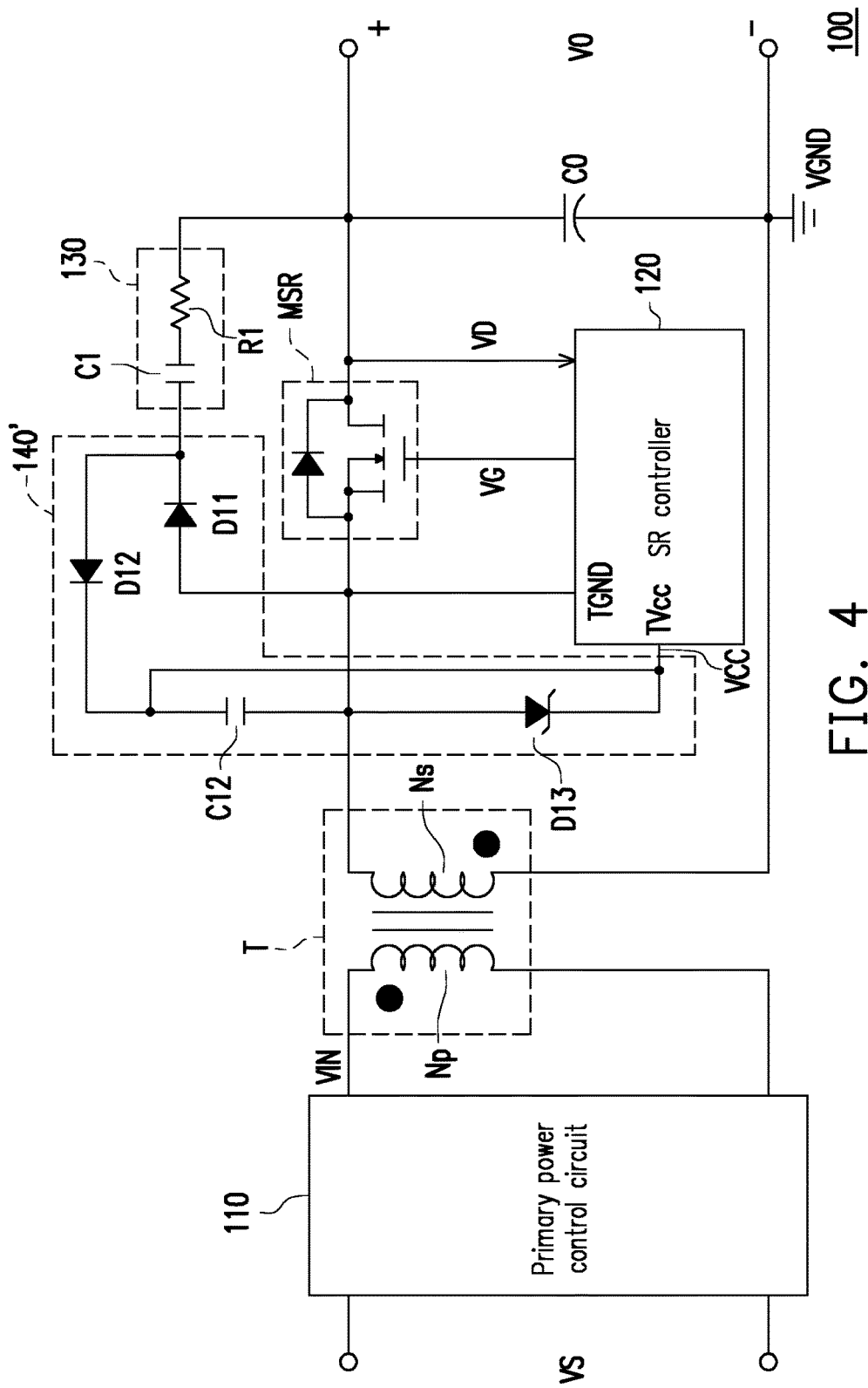
FIG. 4 is a schematic circuit architecture diagram of the power conversion apparatus depicted in FIG. 1 according to another embodiment of the invention.

FIG. 4 is a schematic circuit architecture diagram of the power conversion apparatus depicted in FIG. 1 according to another embodiment of the invention. Referring to FIG. 4, a primary power control circuit 110, a transformer T, an SR transistor MSR and an SR controller 120 illustrated in FIG. 4 are respectively similar to the primary power control circuit 110, the transformer T, the SR transistor MSR and the SR controller illustrated in FIG. 1, which may thus refer to the description related to FIG. 1 and thus, will not be repeatedly described. Moreover, a snubber circuit 130 illustrated in FIG. 4 is similar to the snubber circuit 130 illustrated in FIG. 2, which may thus refer to the description related to FIG. 2 and thus, will not be repeatedly described.

A power supply circuit 140 illustrated in FIG. 4 includes a first diode D11, a second diode D12, a Zener diode D13 and a second capacitor C12, but the invention is not limited thereto. An anode terminal of the first diode D11 is coupled to the source terminal of the SR transistor MSR, and a cathode terminal of the first diode D11 is coupled to the second terminal of the snubber circuit 130. An anode terminal of the second diode D12 is coupled to the cathode terminal of the first diode D11. A first terminal of the second capacitor C12 is coupled to the source terminal of the SR transistor MSR, and a second terminal of the second capacitor C12 is coupled to a cathode terminal of the second diode D12 to provide the system voltage VCC. The Zener diode D13 and the second capacitor C12 are connected in parallel for stabilizing the system voltage VCC. To be detailed, an anode terminal of the Zener diode D13 is coupled to the first terminal of the second capacitor C12, and a cathode terminal of the Zener diode D13 is coupled to the second terminal of the second capacitor C12.

Being similar to the operation of the snubber circuit 130 and the power supply circuit 140 in FIG. 2, in FIG. 4, when the SR transistor SMR is in a turned-off state, a voltage drop is generated between the drain terminal and the source terminal of the SR transistor MSR, wherein the voltage drop may charge the second capacitor C12 and supply power to the SR controller 120 through the resistor R1, the first capacitor C1 and the second diode D12. By contrast, when the SR transistor MSR is in a turned-on state, the first capacitor C1 may be discharged through the resistor R1, the SR transistor MSR and the first diode D11, and the SR controller 120 may be supplied with power by the second capacitor C12.

Based on the above, in the power conversion apparatus provided by the embodiments of the invention, the snubber circuit and the power supply circuit can operate in cooperation to suppress the voltage surge between the drain terminal and the source terminal of the SR transistor and generate the system voltage according to the voltage drop between the drain terminal and the source terminal of the SR transistor, thereby supplying power to the SR controller. Thus, the system voltage required for the operation of the SR controller does not have to be supplied by the auxiliary coil of the transformer, such that the cost and the difficulty in the winding of the transformer can be reduced. In addition, the system voltage required for the operation of the SR controller is also not provided by the coil of the secondary side of the transformer, such that in a condition that a voltage of the coil of the secondary side is high, the power consumption additionally generated due to the voltage being bucked through the rectification diode and the regulator circuit can be prevented.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A power conversion apparatus, comprising:
a synchronous rectification (SR) transistor;
an SR controller, coupled to the SR transistor to control the SR transistor, wherein a ground terminal of the SR controller is coupled to a source terminal of the SR transistor, and a power terminal of the SR controller receives a system voltage;
a snubber circuit, having a first terminal coupled to a drain terminal of the SR transistor and a second terminal coupled to the power terminal of the SR controller,
wherein the snubber circuit obtains power from the drain terminal of the SR transistor and provides the system voltage accordingly; and
a power supply circuit, coupled to the second terminal of the snubber circuit and the source terminal of the SR transistor,
wherein the snubber circuit and the power supply circuit operate in cooperation to suppress a voltage surge between the drain terminal and the source terminal of the SR transistor and generate the system voltage according to a voltage drop between the drain terminal and the source terminal of the SR transistor.

2. The power conversion apparatus according to claim 1, wherein the snubber circuit comprises:
a resistor, having a first terminal coupled to the drain terminal of the SR transistor; and
a first capacitor, coupled between a second terminal of the resistor and the power supply circuit.

3. The power conversion apparatus according to claim 2, wherein the power supply circuit comprises:
a first diode, having an anode terminal coupled to the source terminal of the SR transistor and a cathode terminal coupled to the second terminal of the snubber circuit;
a second diode, having an anode terminal coupled to the cathode terminal of the first diode; and
a second capacitor, having a first terminal coupled to the source terminal of the SR transistor and a second terminal coupled to the cathode terminal of the second diode to provide the system voltage.

4. The power conversion apparatus according to claim 3, wherein the first diode is a Zener diode.

5. The power conversion apparatus according to claim 3, wherein the power supply circuit further comprises:
a Zener diode, having an anode terminal coupled to the first terminal of the second capacitor and a cathode terminal coupled to the second terminal of the second capacitor.

6. The power conversion apparatus according to claim 3, wherein when the SR transistor is in a turned-off state, the voltage drop charges the second capacitor and supplies power to the SR controller through the resistor, the first capacitor and the second diode.

7. The power conversion apparatus according to claim 3, wherein when the SR transistor is in a turned-on state, the first capacitor is discharged through the resistor, the SR transistor and the first diode, and the second capacitor supplies power to the SR controller.

8. The power conversion apparatus according to claim 3, wherein the SR controller provides a control signal to a gate terminal of the SR transistor, and the system voltage is determined according to the following formula:

$$VCC = C \times \left( \frac{Vds - Vf}{\frac{1}{RL \times f} + C} \right),$$

wherein VCC represents the system voltage, C represents a capacitance value of the first capacitor, Vds represents the voltage drop, Vf represents a forward bias voltage of the second diode, RL represents an equivalent impedance between the power terminal and the ground terminal of the SR controller, and f represents a switching frequency of the control signal.

* * * * *